United States Patent Office 2,911,953
Patented Nov. 10, 1959

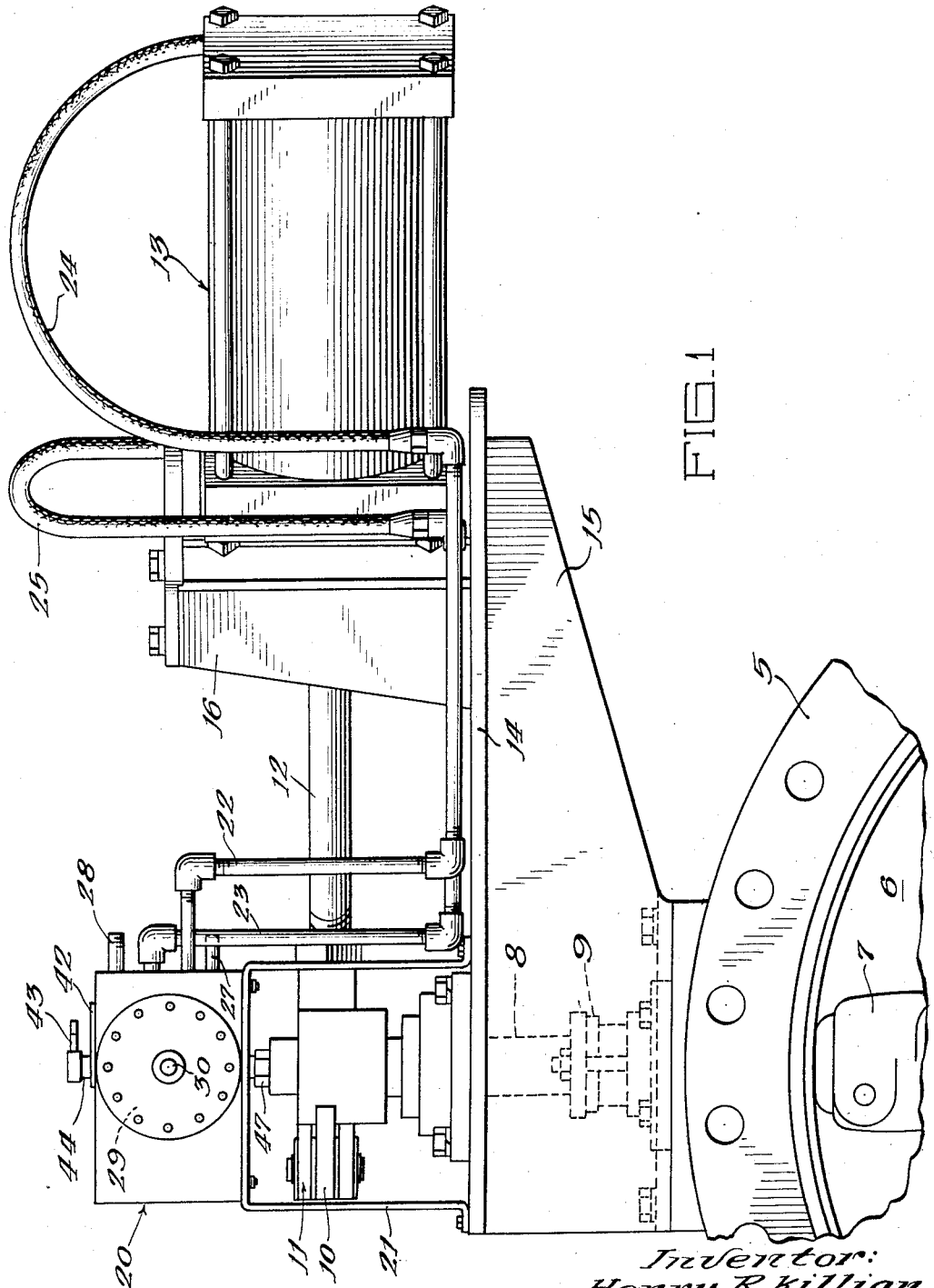

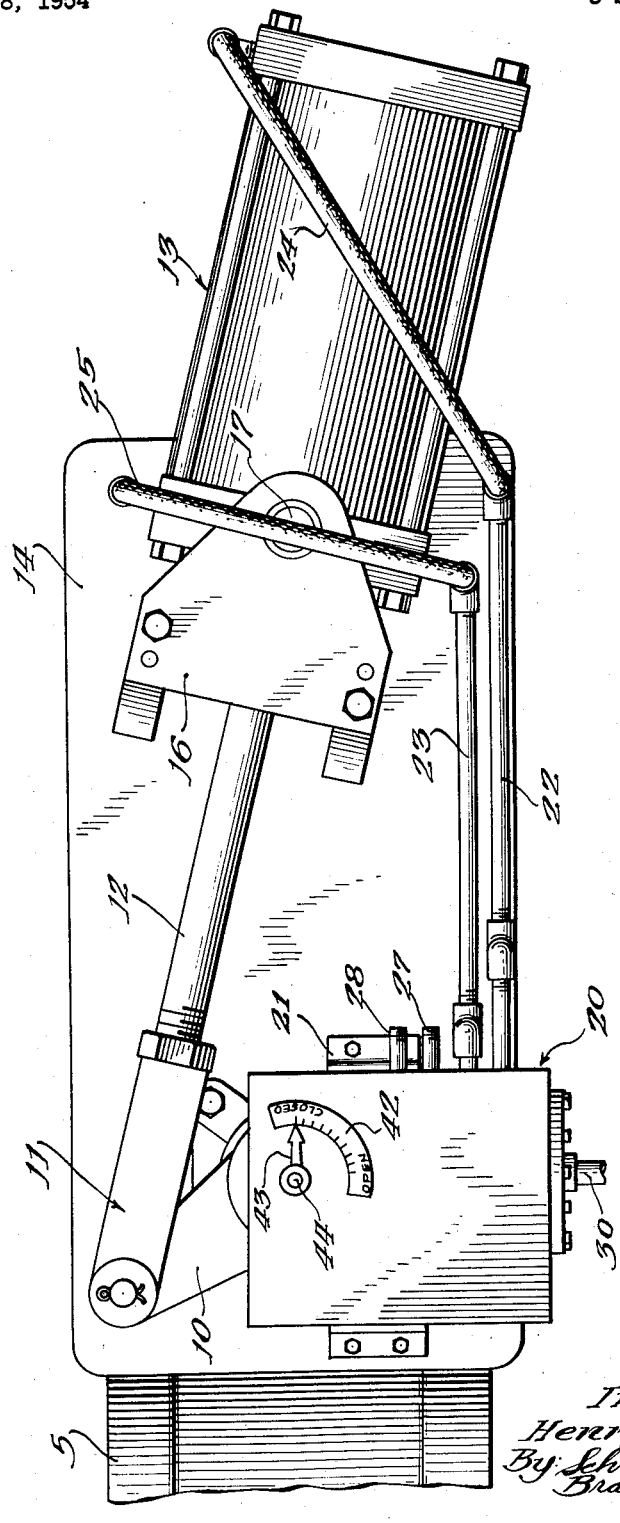

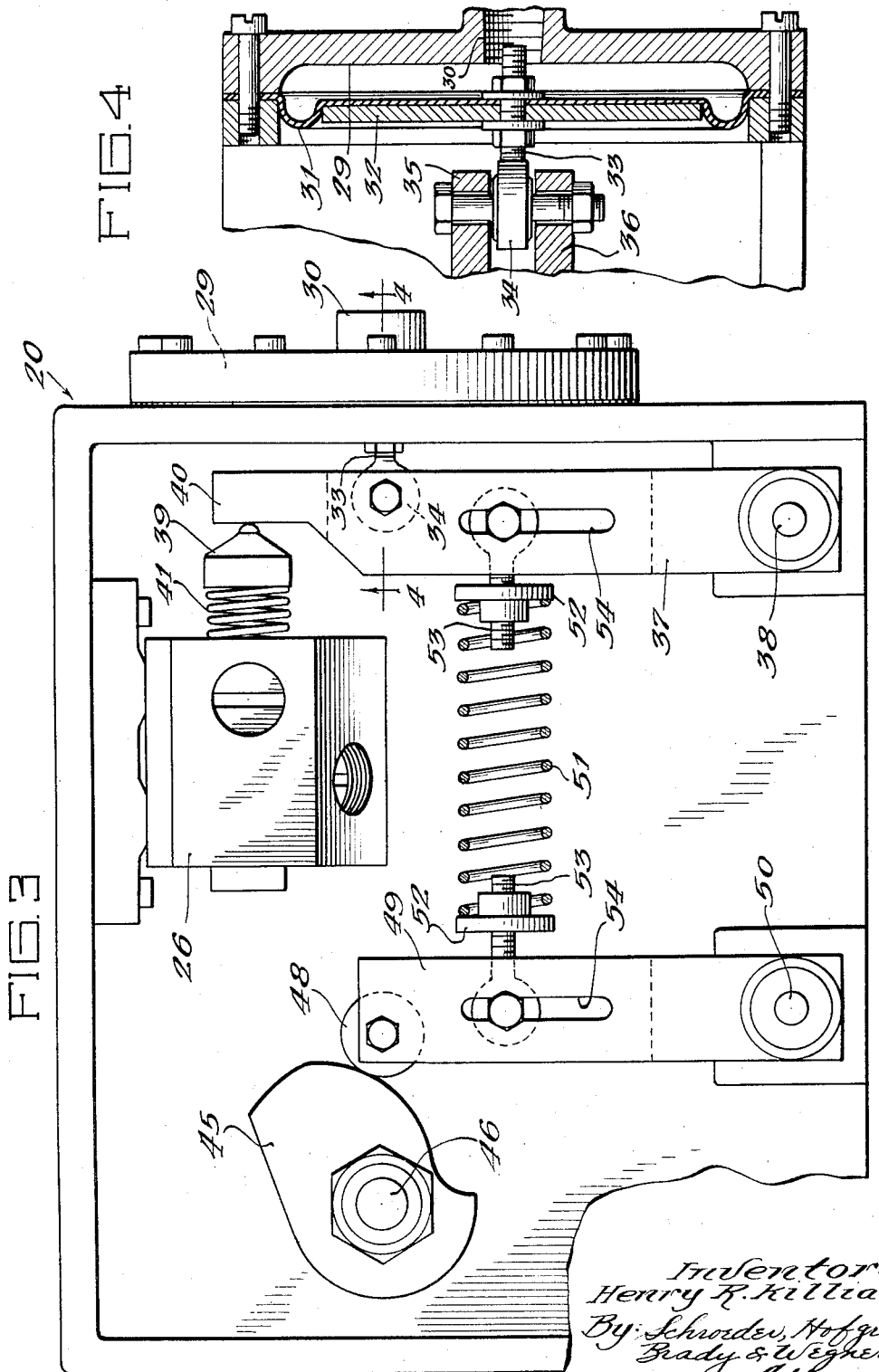

2,911,953
ROTARY POSITIONER CONTROL UNIT FOR A VALVE

Henry Richard Killian, Chicago, Ill., assignor to Henry Pratt Company, a corporation of Illinois Application December 8, 1954, Serial No. 473,978

3 Claims. (Cl. 121—41)

This invention relates to a rotary positioner and more particularly to a device for automatically controlling the positioning of a member in response to a remote manual selection of position to which the device is desired to be moved.

The positioner of this invention is a unit which may control the positioning of a rotary shaft such as might be found on valves of different types such as butterfly, cone and plug as well as other devices such as louvers. In addition, the positioner could be used to control the positioning of a member movable in a linear path. On an application such as a butterfly valve, shown in the specific embodiment to be illustrated, the positioner is a unit independent of the particular motor used to open and close the valve. It thus may be used on valves of different sizes and with operating motors of different sizes with very little or no adjustment.

The device of the invention controls flow of motive fluid to a motor in response to an air pressure setting which may be made from some remote point. In this manner, the operator need only select a particular position desired for say a butterfly valve, which selection can be made by a simple commercial valve mechanism which may vary air pressure delivered to the positioner. From this point on, the positioner automatically will stop movement of the valve member when it reaches the position corresponding to the particular air pressure selected.

The primary object of this invention is to provide a new and improved positioner unit of the character described.

Another object is to provide a positioner for a rotary member which is independent in its operation from the prime mover used to operate the member.

Another object is to provide a positioner of the character described which is operable with motor means of different sizes without requiring more than slight adjustment.

Other objects, features and advantages of the present invention will be apparent from the following description of a single embodiment illustrated in the accompanying drawings, in which:

Figure 1 is a fragmentary side elevational view of a butterfly valve, its operating motor and the rotary positioner of this invention therein;

Figure 2 is a top plan view of the device illustrated in Figure 1;

Figure 3 is a fragmentary plan view of the rotary positioner with the top removed so as to show the interior structure; and Figure 4 is a fragmentary sectional view through the air chamber of the positioner taken substantially along line 4—4 in Figure 3.

The positioner of this invention, in general, includes a four-way valve which controls flow of fluid to a motor intended to effect the movement of the member to be positioned. This valve is operated by a swingable arm balanced in a neutral position and which may be unbalanced to either side by a change in air pressure within an expansible chamber bearing on the arm. The control is in part exercised by a feedback arrangement including a cam on a shaft which is arranged to rotate in proportion to the movement of the member to be positioned, an arm riding on the cam and compressing a spring against the arm to be balanced. In this manner, the first arm can be unbalanced to move the four-way valve and then returned to a balanced neutral position by the feedback arrangement, thus automatically stopping flow of motive fluid to the motor which is effecting the movement of the member to be positioned.

The particular embodiment of the present invention is shown as it may be used for positioning a relatively large butterfly valve member. In Figures 1 and 2, a valve casing 5 has a gate or closure member 6 mounted on a central shaft 7, which shaft has an upwardly extending portion 8 passing through a packing 9 above the valve body. A crank arm 10 is secured to the shaft portion 8 for the reception of a bifurcated connector 11 connected to the free end of a piston rod 12 of a piston and cylinder device 13. The operating mechanism for the valve is supported upon a platform 14 having a gusset type brace 15 so as to support a standard 16 in which the piston and cylinder device 13 may be pivotally mounted on trunnions 17. Thus, the cylinder may swivel as required by a movement of the arm 10 about the center of the valve shaft portion 8.

The operating medium for the piston and cylinder device may be air, oil, water, or the motor may be of a different type such as rotary air or hydraulic motors. The type of motor is unimportant since the positioner is used primarily to direct the motive fluid to the motor.

The positioner unit 20 is mounted on top of a stand 21 just above the upper end of the shaft portion 8 of the valve. This positioner has lines or connecting portions 22 and 23 joined respectively to opposite ends of the cylinder by flexible hose portions 24 and 25. These lines lead to a four-way valve structure 26 seen in Figure 3. Fluid supply to the four-way valve is connected to a nipple 27 and a similar nipple 28 may drain fluid from the four-way valve.

The control of the positioner of the butterfly valve gate 6 may be made from a remote position with the use of a commercial pressure reducing air valve. The operator need only move the pointer of such a valve to the position he desires the valve to be moved to whereupon the positioner will control the movement of the valve to that position. The positioner itself is illustrated in Figures 3 and 4. An air chamber 29 is provided with an inlet and outlet port 30 so that air pressure may move a diaphragm 31 backed up by a plate 32. This diaphragm is connected by a short stub shaft 33 to a self-aligning bearing 34 held between the bifurcated portions 35 and 36 of a balancing arm 37. As the air pressure is increased, the balancing arm will swing on its pivot 38 to the left as illustrated in Figure 3. A reduction in the air pressure will swing the arm in the opposite direction. The actuator for admitting fluid to the piston and cylinder device 13 is the four-way valve 26 having plunger or actuator 39 riding on the outer end 40 of the balancing arm. A light compression spring 41 insures that the plunger or movable member remains in contact with the arm.

The balancing arm 37 is shown in a neutral position wherein the plunger of the four-way valve is in a null position. As shown in Figure 2, the valve is in closed position as indicated on the dial 42 by a pointer 43 connected to a shaft extension 44 connected to the shaft portion 8 of the valve.

The valve is moved by upsetting the balance in position of the balancing arm 37 by changing the air pressure in the air chamber 29. When this occurs, the four-way valve plunger is moved, admitting fluid to one end or the other of the cylinder depending upon the direction of movement. This condition persists until the feedback arrangement returns the balancing arm to a neutral position and thus the four-way valve to null position. The feedback arrangement includes a cam 45 on a shaft extension 46 which is connected as by a nut 47 to the top of the valve shaft 8. This cam rides against a follower 48 on the end of the feedback arm 49 swingably movable about a pivot 50. A compression spring 51 yieldingly urges the feedback arm and balancing arm apart. The ends of the springs are supported on caps 52 mounted on eye-bolts 53 adjustably held in position in longitudinal slots 54 on the arms. Thus, the compression of the spring 51 may be adjusted as conditions require.

In operation, the air pressure in the chamber is changed, for instance decreased to move the balancing arm to the right as viewed in Figure 3. The plunger of the four-way valve is thus moved to the right admitting fluid through the line 23 and hose 25 to the front of the cylinder to withdraw the piston rod 12 and thus move the valve toward open position. The compression spring 51 between the arms was extended a small amount by this movement but at the same time the air pressure was decreased so that the spring and air pressure now hold the balancing arm in a position moved to the right from its neutral position.

To return the balancing arm to neutral position, the pressure of spring 51 must be further reduced. As the valve shaft is moved, the cam 45 is rotated in a counterclockwise position as seen in Figure 3 so that the feedback arm 49 swings to the left further reducing the spring pressure 51 between the arms. This will continue until the spring pressure and air pressure again move the balancing arm 37 to its neutral position. When this occurs, of course, the four-way valve is again placed in null position and no more fluid is admitted to the cylinder. The balancing arm 37 may be moved to either side of its neutral position to effect movement of the valve shaft in either direction.

The present positioner is a unit which may be substituted with very little adjustment on different valves or in different situations involving different sizes of motors. The stub shaft 46 which holds the cam 45 may be connected to a rotary shaft or geared so as to indicate proportional movement of some linearly moved object. The four-way valve may control flow of motive fluid to various types of motors without particularly affecting the operation of the positioner itself. It will be noted that the feedback arrangement is responsive entirely to the position of the device or object to be positioned. In this manner, the unit may be transferred from one application to another.

The foregoing detailed description is given for clearness of understanding only, and no unnecessary limitations should be understood therefrom, for some modifications will be obvious to those skilled in the art.

I claim:

1. A control unit adapted for interchangeable use with different rotary valves each having a motor means for turning a valve shaft to move a valve between open and closed position, comprising: a housing provided with a mounting base, a rotary valve shaft projecting through said base and into said housing; a pair of arms pivoted in the housing and having a spring between and engaging the arms for biasing them for opposite directional movement; an expansible air chamber holding one arm in opposition to said bias and having a port adapted for connection with a source of control air pressure; a motor means control element in the housing having portions operatively connected with a motor means for turning said valve shaft, said control element having a null position and an actuating position and being provided with a movable member movable with said one arm to shift said control element between said positions; and a cam rotatably mounted in the housing and being connected to the valve shaft for movement in unison degree-by-degree with said valve shaft, said cam being positioned to bear against and hold the other arm in opposition to said spring bias and being shaped to increase the spring bias when the valve shaft is turned in one direction and to decrease the spring bias when the valve shaft is turned in an opposite direction so that the turning of said cam is solely responsive to degrees of rotation and always returns the control element toward null position to arrest the valve shaft in the desired position.

2. A control unit for varying the position of a motor operated rotary valve closure member on a valve shaft, comprising: a control unit housing provided with a mounting base, a rotary valve shaft projecting through said base and into said housing; a pair of arms pivoted in the housing and having a spring between and engaging the arms for biasing them for opposite directional movement; an expansible air chamber holding one arm in opposition to said bias and having a port adapted for connection with a source of control air pressure; a motor means control element in the housing and having a movable member arranged for movement with the arm held by control pressure in said air chamber, said control element having connections providing operative engagement with motor means for turning the valve shaft and being constructed to have a null position with movement out of said null position activating the motor means to turn the valve shaft; and a cam mounted on a shaft in the housing and being operatively connected for movement in unison degree-for-degree of angular rotation with the valve shaft, said cam bearing against and holding the other arm in opposition to said spring bias and being shaped to return said control element toward null position as the cam is turned by relieving the spring bias on said other arm when the valve shaft is turned in one direction and by increasing the spring bias on said other arm when the valve shaft is turned in the opposite direction.

3. A valve positioner for controlling the position of a butterfly valve gate shaft, comprising: a housing provided with a mounting base, a valve shaft projecting into said housing, a pair of arms pivoted in the housing and having a spring between and engaging said arms for biasing them for opposite directional movement, an expansible air chamber holding one arm in opposition to said bias and having a port adapted for connection with a source of control air pressure, a motor means control element in the housing operatively connected to a motor means for moving said butterfly valve shaft, said control element having a null position and an actuating position and being provided with a movable member engaging said one arm for movement therewith to shift said control element between said positions, and a cam rotatably mounted in the housing and being connected for rotatable movement in unison degree-by-degree with the valve shaft, said cam being positioned to bear against and hold the other arm in opposition to said spring bias and being shaped to increase the spring bias when the valve shaft is turned in one direction and to decrease the spring bias when the valve shaft is turned in an opposite direction, so that the turning of said cam is solely in response to the identical degree of rotation of the valve shaft and always returns the control element toward null position to arrest the valve shaft in the desired position.

References Cited in the file of this patent

UNITED STATES PATENTS

| | | |
|---|---|---|
| 1,666,270 | Soderberg | Apr. 17, 1928 |
| 2,264,262 | Ergbuth | Nov. 25, 1941 |
| 2,408,685 | Rosenberger | Oct. 1, 1946 |
| 2,500,407 | Segerstad | Mar. 14, 1950 |
| 2,600,777 | Johnson | June 17, 1952 |
| 2,658,525 | Shannon | Nov. 10, 1953 |
| 2,752,891 | Farkas | July 3, 1956 |

FOREIGN PATENTS

| | | |
|---|---|---|
| 575,899 | Great Britain | Mar. 11, 1946 |